US009923436B2

(12) United States Patent
Takahashi

(10) Patent No.: US 9,923,436 B2
(45) Date of Patent: Mar. 20, 2018

(54) ROTOR FOR A ROTARY ELECTRIC MACHINE

(71) Applicant: DENSO CORPORATION, Kariya, Aichi-pref. (JP)

(72) Inventor: Yuki Takahashi, Obu (JP)

(73) Assignee: DENSO CORPORATION, Kariya (JP)

( * ) Notice: Subject to any disclaimer, the term of this patent is extended or adjusted under 35 U.S.C. 154(b) by 291 days.

(21) Appl. No.: 14/686,969

(22) Filed: Apr. 15, 2015

(65) Prior Publication Data
US 2015/0295462 A1 Oct. 15, 2015

(30) Foreign Application Priority Data
Apr. 15, 2014 (JP) .................................. 2014-083774

(51) Int. Cl.
*H02K 1/27* (2006.01)
*H02K 15/03* (2006.01)

(52) U.S. Cl.
CPC ........... *H02K 15/03* (2013.01); *H02K 1/2766* (2013.01)

(58) Field of Classification Search
CPC ............................ H02K 1/2766; H02K 1/276
USPC ............ 310/156.56, 156.53, 156.83, 156.57
See application file for complete search history.

(56) References Cited

U.S. PATENT DOCUMENTS

| 2007/0063607 A1* | 3/2007 | Hattori | H02K 1/2766 |
| | | | 310/156.53 |
| 2007/0126304 A1* | 6/2007 | Ito | H02K 1/2766 |
| | | | 310/156.53 |
| 2009/0026867 A1* | 1/2009 | Haruno | H02K 1/2766 |
| | | | 310/156.21 |
| 2011/0241468 A1 | 10/2011 | Inagaki et al. | |
| 2011/0278977 A1* | 11/2011 | Utaka | H02K 1/2766 |
| | | | 310/156.53 |
| 2014/0124980 A1 | 5/2014 | Nagai et al. | |

FOREIGN PATENT DOCUMENTS

| JP | 06-286649 | 10/1994 |
| JP | 2008-029169 | 2/2008 |
| JP | 2011-211860 | 10/2011 |

* cited by examiner

*Primary Examiner* — Thomas Troung
(74) *Attorney, Agent, or Firm* — Nixon & Vanderhye P.C.

(57) ABSTRACT

A rotor for a rotary electric machine includes a rotor core which is formed by crimping laminated steel plates so as to be opposed to a stator, and has pairs of magnet housing holes disposed in a V shape, and pairs of magnets housed in the magnet housing holes. The rotor core has a crimped portion formed in a q axis core portion positioned between the two magnet poles, which are adjacent to each other in a circumferential direction, a first flux barrier formed between the q axis core portion and the magnet, and a pair of second flux barriers which enlarges from an end positioned at a center side of the magnet pole of the magnet housing holes toward a central axis of the rotor core. The crimped portion is formed so that distances between the crimped portion and both the first and second flux barriers are equal.

9 Claims, 7 Drawing Sheets

CIRCUMFERENTIAL DIRECTION

ROTOR FOR A ROTARY ELECTRIC MACHINE

CROSS-REFERENCE TO RELATED APPLICATION

This application is based on and claims the benefit of priority from earlier Japanese Patent Application No. 2014-63774 filed Apr. 15, 2014, the description of which is incorporated herein by reference.

BACKGROUND

Technical Field

The present invention relates to a rotor for a rotary electric machine which is installed in a vehicle such as a hybrid car and an electric car and is used as a motor and a generator.

Related Art

A revolving-field type synchronous motor (hereinafter, referred to as "IPM motor") is known as a rotary electric machine which is installed in a vehicle or the like. The IPM motor has a structure in which magnets are buried in a rotor. Since the IPM motor can utilize reluctance torque produced by magnetization of the rotor and torque produced by magnetization of the magnets, the IPM motor operates at high efficiency. Hence, the IPM motor has been appropriately employed for a hybrid car, an electric car and the like.

Such an IPM motor includes a stator and a rotor, which is disposed so as to be opposed to the stator in the radial direction. In addition, a rotor is known which includes a rotor core and a plurality of pairs of magnets. The rotor core is formed by laminating a plurality of steel plates in the axial direction and crimping the steel plates. The rotor core has a plurality of pairs of magnet housing holes disposed in a V shape so that the distance therebetween increases toward the stator. Each pair of magnets is housed in the pair of the magnet housing holes to form a magnet pole.

JP-A-2011-211860 discloses a technique for providing a central barrier (flux barrier) serving as a magnetic air gap on a d axis of a rotor core to obtain reluctance torque by increasing the difference between d axis inductance and q axis inductance. JP-6-284649 discloses a rotor core and a manufacturing method thereof, the rotor core being formed by cramping a plurality of steel plates laminated in the axial direction.

According to the structure of the rotor disclosed in JP-A-2011-211860, the d axis inductance can be decreased, and flux leakage to the central barrier can be suppressed. However, when large centrifugal force is caused, the force for cutting out the rotor becomes large.

When the rotor core formed by laminating a plurality of steel plates in the axial direction is fixed by using the technique disclosed in JP-6-284649, stress concentration is caused between the cramping portion and the central barrier. In this case, great stress concentration is caused due to the influence of centrifugal stress and heat stress caused by the difference between coefficients of linear expansion of the rotor core and the magnet.

SUMMARY

An embodiment provides a rotor for a rotary electric machine which can lower stress concentration in a rotor core formed by cramping a plurality of steel plates laminated in the axial direction.

An embodiment provides a rotor for a rotary electric machine, including: a rotor core which is formed by crimping a plurality of steel plates laminated in an axial direction so as to be opposed to a stator in a radial direction, and has a plurality of pairs of magnet housing holes, each of the pairs being disposed in a V shape so that a distance between the magnet housing holes increases toward the stator; and a plurality of pairs of magnets each of which is housed in the pair of the magnet housing holes to form a magnet pole. The rotor core has a crimped portion which is formed in a q axis core portion positioned between two of the magnet poles, which are adjacent to each other in a circumferential direction and have different polarities, a first flux barrier formed between the q axis core portion and the magnet, and a pair of second flux barriers which enlarges from an end positioned at a center side of the magnet pole of the respective magnet housing holes, which are a pair, toward a central axis of the rotor core. The crimped portion is formed so that a distance between the crimped portion and the first flux barrier is equal to a distance between the crimped portion and the second flux barrier.

DETAILED DESCRIPTION OF THE PREFERRED EMBODIMENTS

With reference to the accompanying drawings, hereinafter are described some embodiments of the present invention.

First Embodiment

Figure 1:
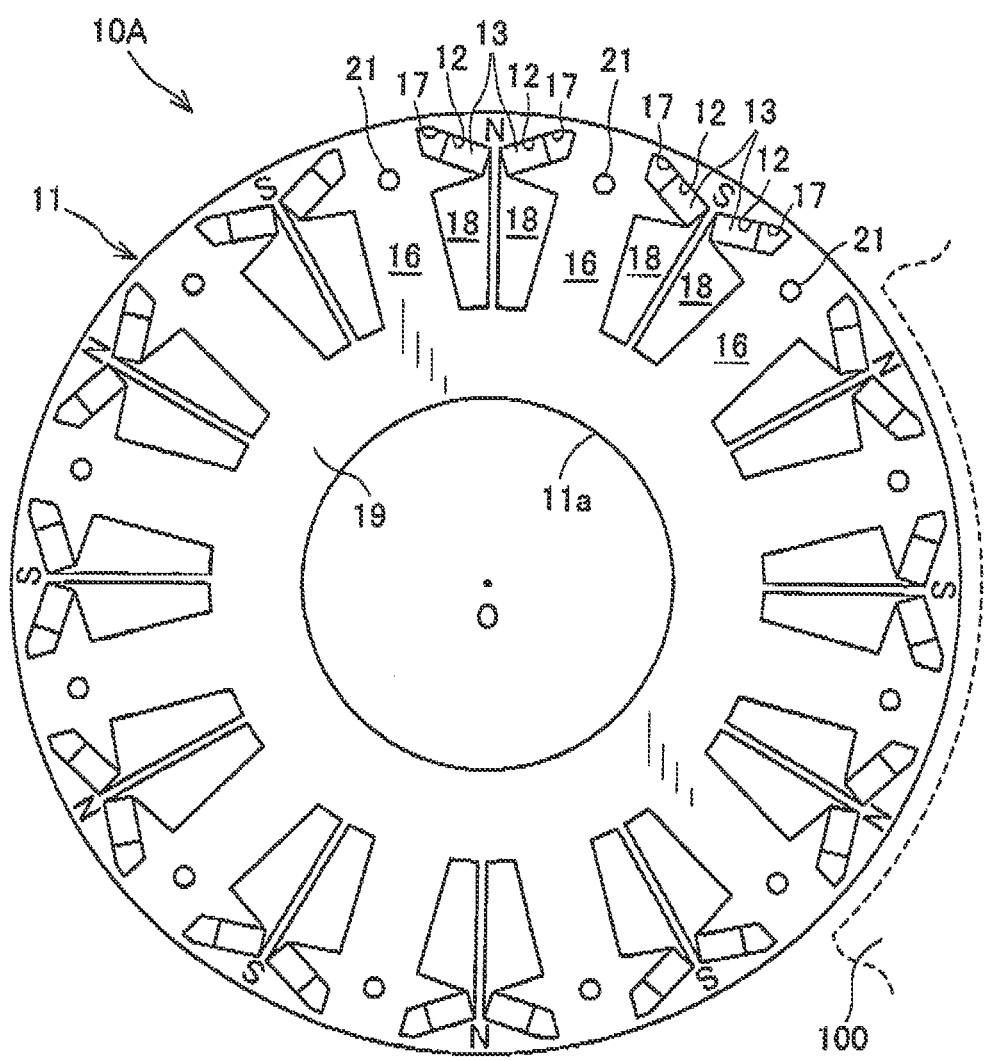
FIG. 1 is a plan view of a rotor of a rotary electric machine according to a first embodiment.
Figure 2:
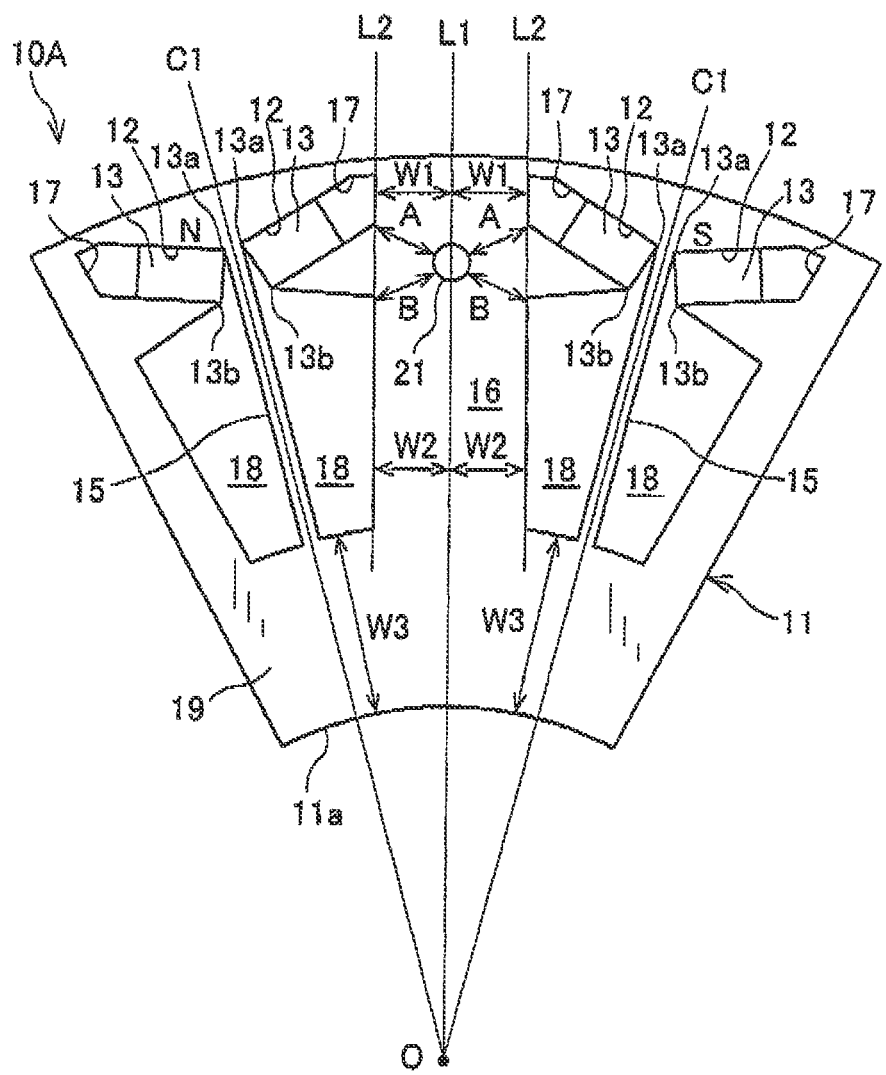
FIG. 2 is a partial plan view of the rotor, including two magnetic poles, of the rotary electric machine according to the first embodiment.

A rotor for a rotary electric machine according to the first embodiment is described with reference to FIGS. 1 to 3. A rotor 10A of the first embodiment is installed in a rotary electric machine (not shown) used as, for example, a motor for a vehicle. The rotor 10A is accommodated in a housing of the rotary electric machine. The rotor 10A is rotatably disposed along an inner circumference of a stator 100 (partially shown in FIG. 1) having a cylindrical shape. The rotary electric machine has a rotating shaft (not shown) whose both ends are rotatably supported on the housing via bearings. The rotor 10A of the first embodiment is fitted and fixed to the outer periphery of the rotating shaft.

The rotor 10A is disposed so as to be opposed to the stator 100 in the radial direction. The rotor 10A includes a rotor core 11, which has a plurality of magnet housing holes 12 arranged in the circumferential direction, and a plurality of magnets (permanent magnets) 13, which are buried in respective magnet housing holes 12.

The rotor core 11 is formed by laminating annular steel plates 20 provided with a through hole 11a at the center thereof so as to be a thick cylinder shape. The rotor core 11 is fixed to the outer periphery of the rotating shaft by fitting the rotating shaft into the through hole 11a. The plurality of magnet housing holes 12 (the number of which is 24 in the first embodiment), which penetrate the rotor core 11 in the axial direction, are provided along the outer periphery of the rotor core 11 with a predetermined distance therebetween in the circumferential direction, the outer periphery being opposed to the inner periphery of the stator 100.

In the first embodiment, a plurality of pairs (12 pairs) of magnet housing holes 12 are provided. The pair of magnet housing holes 12 is disposed in a V shape so that the distance therebetween increases toward the outer periphery of the rotor core 11. A central bridge 15 having a substantially constant width is formed between the pair of magnet housing holes 12 so as to extend in the radial direction. The central bridge 15 causes magnetic flux saturation between the pair of magnet housing holes 12, 12 to prevent a magnetic circuit from being formed.

In each of the magnet housing holes 12, one magnet (permanent magnet) 13 is housed whose cross-sectional shape perpendicular to the central axis O of the rotor core 11 is rectangle. In the first embodiment, one magnetic pole is formed of a pair of magnets 13, 13 housed in the pair of magnet housing holes 12, 12 arranged in a V shape. In this case, a plurality of magnetic poles (12 poles (N poles: 6, S poles: 6) in the first embodiment), whose polarities are alternately changed in the circumferential direction, are formed of twelve pairs of magnets 13, 13. The magnets 13 housed in respective magnet housing holes 12 are positioned, in a state where corner portions 13a, at which an end face of the outside portion in the radial direction and an end face at the center side of the magnet poles meet with each other, come into contact with a root portion of the central bridge 15 positioned at the outside portion in the radial direction.

In one magnet pole of the rotor 10A, a pair of magnet housing holes 12, 12 is formed in symmetry with respect to a magnetic pole center line C1 passing through the central axis O of the rotor core 11 and the center of the magnet pole. In addition, a pair of magnets 13, 13 forming one magnet pole is disposed in symmetry with respect to the magnetic pole center line C1 (in a V shape in which the distance between outer peripheries of magnets 13, 13 becomes larger).

A q axis core portion 16 is formed between two magnet poles adjacent to each other in the circumferential direction of the rotor core 11. A magnetic flux flows through the q axis core portion 16 from a portion between magnet poles to another portion between magnet poles. A first flux barrier 17, which serves as a magnetic air gap, is provided between the magnet 13 housed in the magnet housing hole 12 and the q axis core portion 16, that is, in part of the magnet housing hole 12 close to the q axis core portion 16. The outside in the circumferential direction of the first flux barrier 17 is placed so that a width in the circumferential direction is W1, which is between a q axis center line L1, which passes through the center in the circumferential direction of the q axis core portion 16 and the central axis O, and the first flux barrier 17. The circumferential direction width W1 is the shortest distance between the q axis center line L1 and the first flux barrier 17. In the first embodiment, the circumferential direction width W1 is the distance between the q axis center line L1 and a parallel line L2 parallel to the q axis center line L1.

Note that each of the magnets 13 housed in the magnet housing hole 12 is held by the first flux barrier 17 and a filler (not shown) formed of a nonmagnetic material, such as resin, filled in a minute gap between a wall surface of the outside portion in the radial direction and a wall surface of the inside portion of the magnet housing hole 12.

A pair of second flux barriers 18, 18 is provided at the center side of the magnet poles of the respective magnet housing holes 12, 12, which are a pair. Each of the second flux barriers 18, 18 enlarges from the end positioned at the center side of the magnet pole toward the central axis O. The central bridge 15, which is formed between the pair of magnet housing holes 12, 12 and between the pair of second flux barriers 18, 18, extends toward the central axis O. The second flux barriers 18, 18 enlarge from a line connecting corner portions 13b, 13b toward the central axis O. The shortest distance between the central axis O and the magnet 13 is the distance between the central axis O and the corner portion 13b.

Specifically, each of the second flux barriers 18 is enlarged so that the distance to the inner periphery of the rotor core 11 is W3. That is, each of the second flux barriers 18 is enlarged so that a width in the radial direction is W3, which is between the inner periphery of an annular portion 19 positioned along the inner circumference of the rotor core 11, and the second flux barrier 18. The width in the radial direction W3 is the shortest distance between the inner periphery of the annular portion 19 and the second flux barrier 18. The width is W3 in the radial direction is equal to or more than the width W1 in the circumferential direction.

In addition, the second flux barrier 18 is formed so as to enlarge in the circumferential direction. That is, the outside portion in the circumferential direction of the second flux barrier 18 is enlarged so that a width in the circumferential direction is W2, which is between the q axis center line L1 and the second flux barrier 18. The circumferential direction width W2 is the shortest distance between the q axis center line L1, and the second flux barrier 18. In the first embodiment, the circumferential direction width W2 is the distance between the q axis center line L1 and the parallel line L2 parallel to the q axis center line L1. The circumferential direction width W2 is equal to or more than the circumferential direction width W1. In the first embodiment, the circumferential direction width W2 is equal to the circumferential direction width W1.

A crimped portion 21 is formed in the q axis core portion 16 of the rotor core 11. The crimped portion 21 fixes a plurality of steel plates 20 laminated in the axial direction. The crimped portion 21 of the first embodiment has a circular shape when viewed in the crimping direction (from the near side of FIGS. 1 and 2). The crimped portion 21 is formed so that the distance between the crimped portion 21 and the first flux barrier 17 is equal to the distance between the crimped portion 21 and the second flux barrier 18. That is, as shown in FIG. 2, the crimped portion 21 is formed so that the shortest distance A between the crimped portion 21 and the first flux barrier 17 is equal to the shortest distance B between the crimped portion 21 and the second flux barrier 18 (A=B). Note that the center of the crimped portion 21 is positioned on the q axis center line L1.

Figure 3:
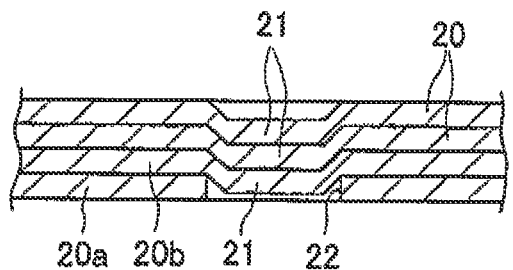
FIG. 3 is a sectional view of a crimped part of the rotor of the rotary electric machine according to the first embodiment.

As shown in FIG. 3, a crimped circular portion of the crimped portion 21 projects from a surface (lower surface shown in FIG. 3) positioned in the direction opposed to the crimping direction. The projecting portion is inserted into a recess formed on the projected back surface side of the crimped portion 21 of the adjacent steel plate 20. Hence, at least the outer periphery on the projected side of the crimped portion 21 comes into contact with the inner periphery of the recess of the crimped portion 21 of the steel plate 20 adjacent to the projected side thereof. Accordingly, the adjacent steel plates 20 are firmly fixed by the crimped portion 21.

In FIG. 3, only four steel plates 20 positioned in the direction opposed to the crimping direction are shown, and other steel plates 20 are not shown. In this case, a circular hole 22, which has a diameter slightly smaller than the diameter of the crimped portion 21 having a circular shape, is formed in a steel plate 20a positioned at the outermost layer (lowermost layer shown in FIG. 3) positioned in the direction opposed to the crimping direction. Hence, the crimped portion 21 of a steel plate 20b adjacent to the steel plate 20a positioned at the outermost layer is pressed into the circular hole 22 of the steel plate 20a positioned at the outermost layer. Thereby, the steel plates 20a, 20b are firmly fixed.

In the rotor 10A of the first embodiment configured as described above, the crimped portion 21 formed in the q axis core portion 16 is formed so that the distance between the crimped portion 21 and the first flux barrier 17 is equal to the distance between the crimped portion 21 and the second flux barrier 18. Hence, stress concentration caused between the crimped portion 21 and both the first flux barrier 17 and the second flux barrier 18 can be effectively decreased. Accordingly, great stress concentration can be prevented which is due to the influence of centrifugal stress and heat stress caused by the difference between coefficients of linear expansion of the rotor core 11 and the magnet 13.

In addition, the crimped portion 21 of the first embodiment has a circular shape when viewed in the crimping direction. According to the shape, it is difficult to cause stress. Hence, the stress concentration can be prevented more reliably.

In addition, since at least corner portions of the projected outer periphery of the crimped portion 21 come into contact with the adjacent steel plate 20, the adjacent steel plates 20 are firmly fixed by the crimped portion 21.

Second Embodiment

Figure 4:
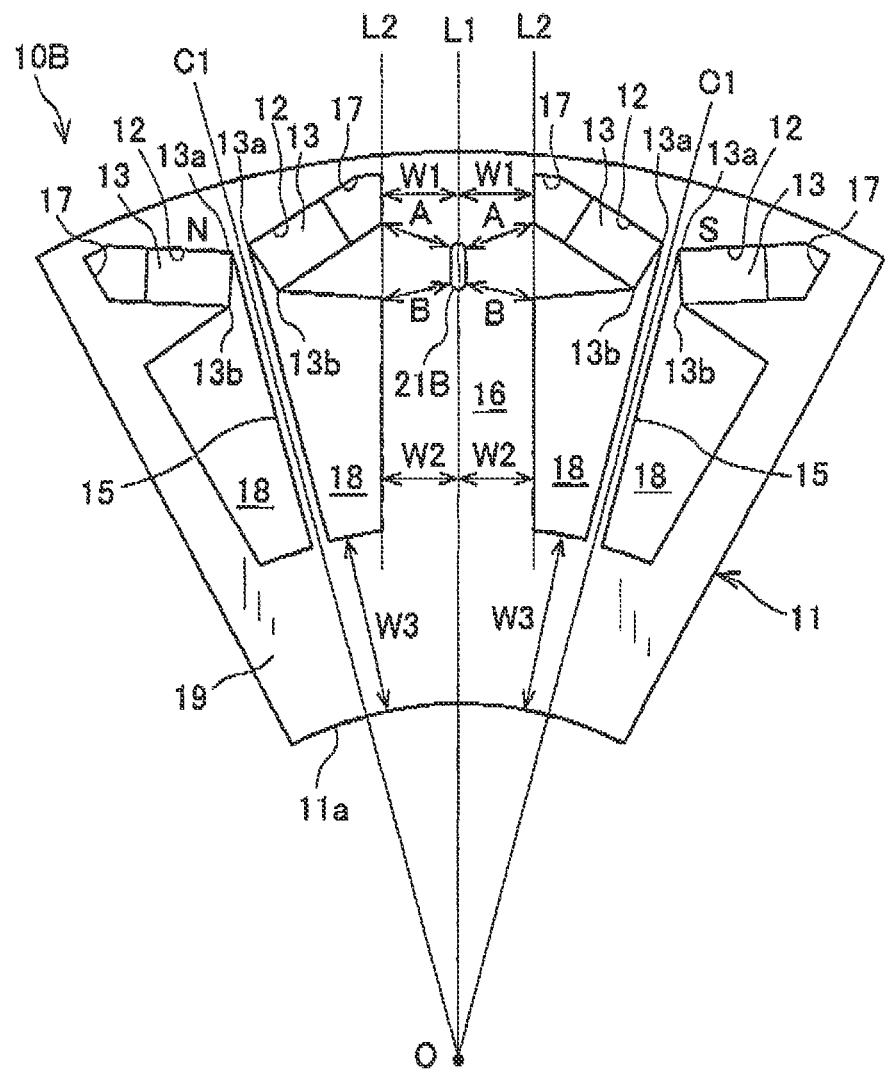
FIG. 4 is a partial plan view of a rotor, including two magnetic poles, of a rotary electric machine according to a second embodiment.
Figure 5:
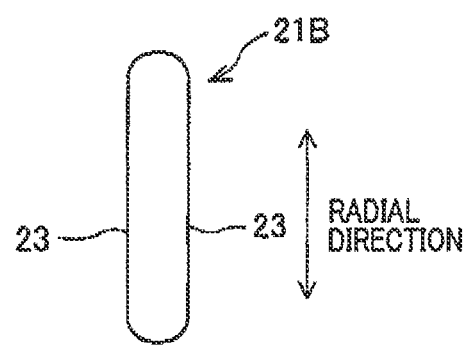
FIG. 5 is a plan view of an enlarged crimped part of the rotor of the rotary electric machine according to the second embodiment.

As shown in FIGS. 4 and 5, in a rotor 10B for a rotary electric machine according to the second embodiment, only a shape of a crimped portion 21B fixing the laminated steel plates 20 configuring the rotor core 11 is different from that in the first embodiment. Hence, detailed explanations of members and configurations common to those of the first embodiment are omitted to explain different points and important points. Note that the same reference numerals as in the first embodiment denote the same parts.

As in the case of the first embodiment, the rotor core 11 of the second embodiment is provided with the magnet housing holes 12, the first flux barriers 17, and the second flux barriers 18 at predetermined positions. As shown in FIG. 4, the crimped portion 21B having an ellipse shape is provided in the q axis core portion 16 of the rotor core 11 so that the major axis of the ellipse is directed in the radial direction. That is, when viewed in the crimping direction, the crimped portion 21B has an ellipse shape having a pair of linear portions 23, 23 extending in the radial direction. Hence, strong crimping force is applied in the circumferential direction.

As in the case of the first embodiment, the crimped portion 21B of the second embodiment is formed so that the distance between the crimped portion 21B and the first flux barrier 17 is equal to the distance between the crimped portion 21B and the second flux barriers 18. That is, as shown in FIG. 4, the crimped portion 21B is formed so that the shortest distance A between the crimped portion 21B and the first flux barrier 17 is equal to the shortest distance B between the crimped portion 21B and the second flux barrier 18 (A=B). Note that, also in the case of the second embodiment, the center of the crimped portion 21B is positioned on the q axis center line L1.

The rotor 10B of the second embodiment configured as described above provides advantages similar to those of the rotor 10A of the first embodiment. For example, stress concentration caused between the crimped portion 21B and both the first flux barrier 17 and the second flux barrier 18 can be effectively decreased.

In addition, the crimped portion 21B of the second embodiment has an ellipse shape having the pair of linear portions 23, 23 extending in the radial direction. Hence, since strong crimping force is applied in the circumferential direction, the center of rotation of the laminated steel plates 20 can be prevented from being deviated even when torque is applied to the rotor core 11.

Although the crimped portion 21B of the second embodiment has an ellipse shape having the pair of linear portions 23, 23 extending in the radial direction, the crimped portion 21B may have an ellipse shape having a pair of curve portions extending in the radial direction.

Third Embodiment

Figure 6:
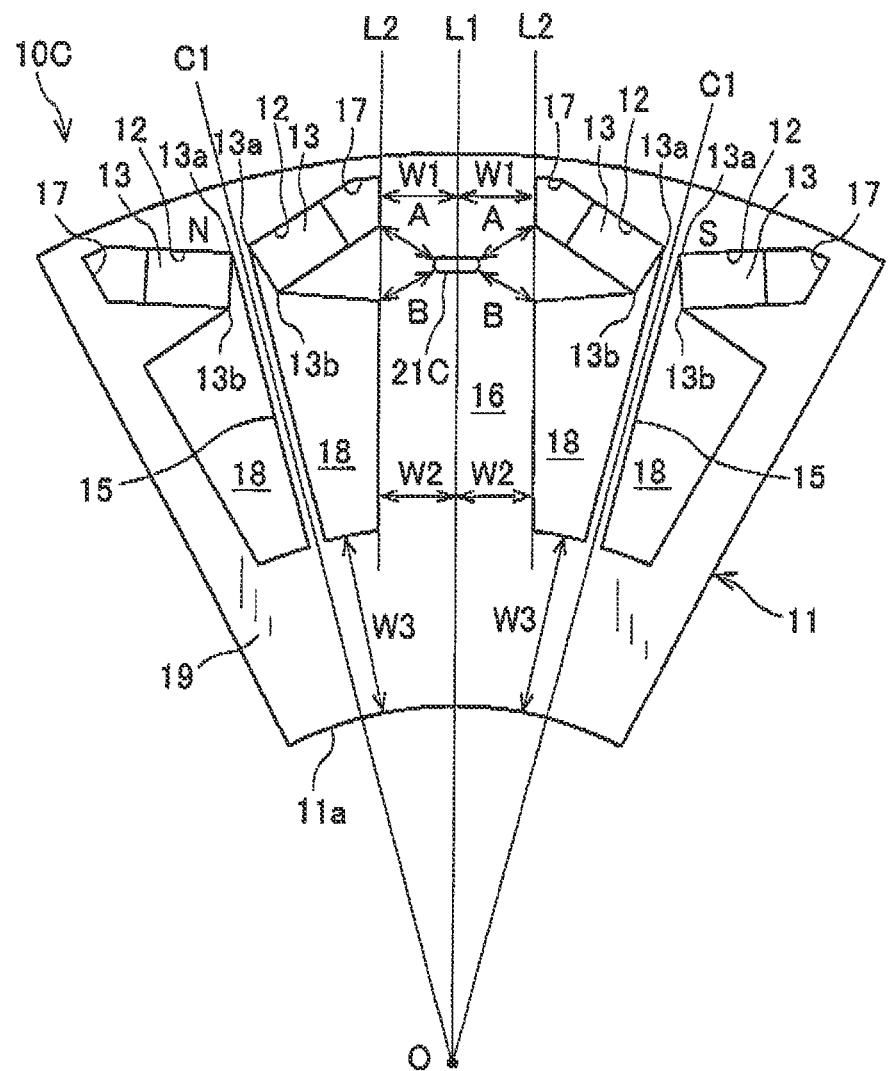
FIG. 6 is a partial plan view of a rotor, including two magnetic poles, of a rotary electric machine according to a third embodiment.
Figure 7:
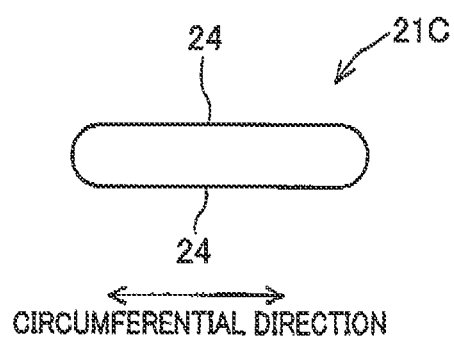
FIG. 7 is a plan view of an enlarged crimped part of the rotor of the rotary electric machine according to the third embodiment.

As shown in FIGS. 6 and 7, in a rotor 10C for a rotary electric machine according to the third embodiment, only a shape of a crimped portion 21C fixing the laminated steel plates 20 configuring the rotor core 11 is different from that in the first embodiment. Hence, detailed explanations of members and configurations common to those of the first embodiment are omitted to explain different points and important points. Note that the same reference numerals as in the first embodiment denote the same parts.

As in the case of the first embodiment, the rotor core 11 of the third embodiment is provided with the magnet housing holes 12, the first flux barriers 17, and the second flux barriers 18 at predetermined positions. As shown in FIG. 6, the crimped portion 21C having an ellipse shape is provided in the q axis core portion 16 of the rotor core 11 so that the major axis of the ellipse is directed in the circumferential direction. That is, when viewed in the crimping direction, the crimped portion 21C has an ellipse shape having a pair of linear portions 24, 24 extending in the circumferential direction. Hence, strong crimping force is applied in the radial direction.

As in the case of the first embodiment, the crimped portion 21C of the third embodiment is formed so that the distance between the crimped portion 21C and the first flux barrier 17 is equal to the distance between the crimped portion 21C and the second first flux barrier 18. That is, as shown in FIG. 6, the crimped portion 21C is formed so that the shortest distance A between the crimped portion 21C and the first flux barrier 17 is equal to the shortest distance B between the crimped portion 21C and the second flux barrier 18 (A=B). Note that, also in the case of the third embodiment, the center of the crimped portion 21C is positioned on the q axis center line L1.

The rotor 10C of the third embodiment configured as describe above provides advantages similar to those of the rotor 10A of the first embodiment. For example, stress concentration caused between the crimped portion 21C and both the first flux barrier 17 and the second flux barrier 18 can be effectively decreased.

In addition, the crimped portion 21C of the third embodiment has an ellipse shape having the pair of linear portions 24, 24 extending in the circumferential direction. Hence, since strong crimping force is applied in the circumferential direction, even when the difference in centrifugal force is generated due to the difference in weight between the laminated steel plates 20 due to the manufacturing tolerance or the like, the steel plates 20 can be prevented from being deviated.

Although the crimped portion 21C of the third embodiment has an ellipse shape having the pair of linear portions 24, 24 extending in the circumferential direction, the crimped portion 21C may have an ellipse shape having a pair of curve portions extending in the circumferential direction. The curve portions preferably have a curvature substantially equal to or less than the curvature of the outer diameter of the rotor core 11.

Fourth Embodiment

Figure 8:
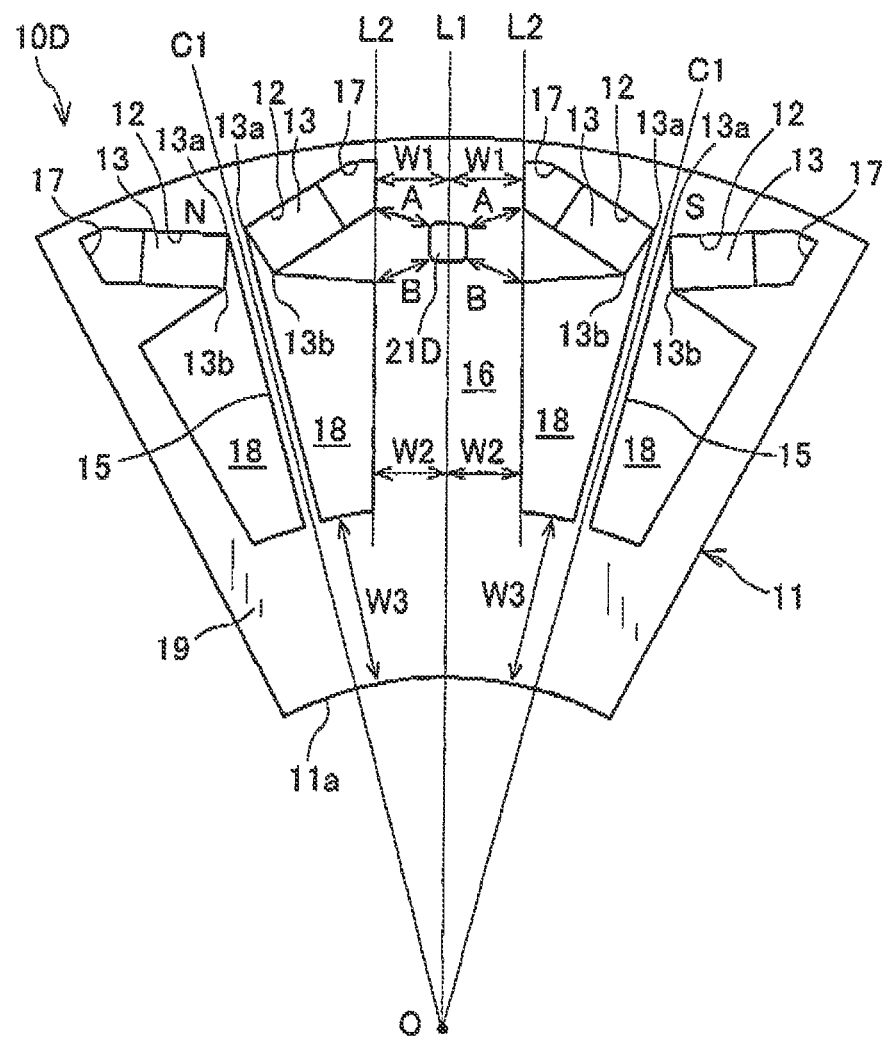
FIG. 8 is a partial plan view of a rotor, including two magnetic poles, of a rotary electric machine according to a fourth embodiment.
Figure 9:
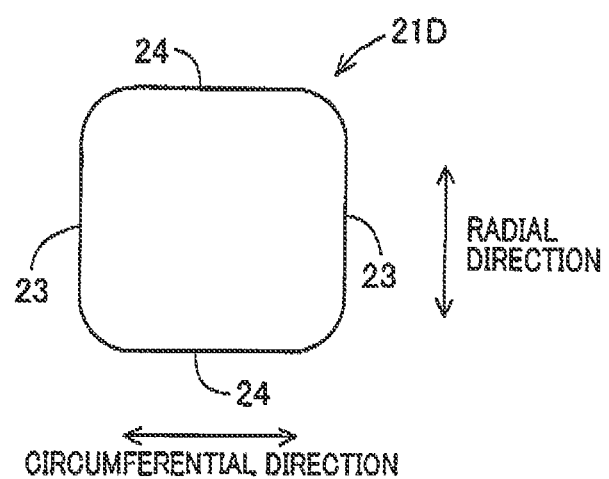
FIG. 9 is a plan view of an enlarged crimped part of the rotor of the rotary electric machine according to the fourth embodiment.

As shown in FIGS. 8 and 9, in a rotor 10D for a rotary electric machine according to the fourth embodiment, only a shape of a crimped portion 21D fixing the laminated steel plates 20 configuring the rotor core 11 is different from that in the first embodiment. Hence, detailed explanations of members and configurations common to those of the first embodiment are omitted to explain different points and important points. Note that the same reference numerals as in the first embodiment denote the same parts.

As in the case of the first embodiment, the rotor core 11 of the fourth embodiment is provided with the magnet housing holes 12, the first flux barriers 17, and the second first flux barriers 18 at predetermined positions. As shown in FIG. 8, when viewed in the crimping direction, the crimped portion 21D having a rectangular shape is provided in the q axis core portion 16 of the rotor core 11. That is, the crimped portion 21D has a rectangular shape having a pair of linear portions 23, 23 extending in the radial direction and a pair of linear portions 24, 24 extending in the circumferential direction. The length of the linear portions 23, 23 and the length of the linear portions 24, 24 are the same. Four corner portions of the crimped portion 21D are shaped into curved surfaces having a predetermined curvature.

As in the case of the first embodiment, the crimped portion 21D of the fourth embodiment is formed so that the distance between the crimped portion 21D and the first flux barrier 17 is equal to the distance between the crimped portion 21D and the second first flux barrier 18. That is, as shown in FIG. 8, the crimped portion 21D is formed so that the shortest distance A between the crimped portion 21D and the first flux barrier 17 is equal to the shortest distance B between the crimped portion 21D and the second flux barrier 18 (A=B). Note that, also in the case of the fourth embodiment, the center of the crimped portion 21D is positioned on the q axis center line L1.

The rotor 10D of the fourth embodiment configured as described above provides advantages similar to those of the rotor 10A of the first embodiment. For example, stress concentration caused between the crimped portion 21D and both the first flux barrier 17 and the second flux barrier 18 can be effectively decreased.

In addition, the crimped portion 21D of the fourth embodiment has a rectangular shape having a pair of linear portions 23, 23 extending in the radial direction and a pair of linear portions 24, 24 extending in the circumferential direction. Hence, since strong crimping force is applied in both the circumferential direction and radial direction, the advantages of both the second and third embodiments can be provided with good balance.

In the crimped portion 21D of the fourth embodiment, the length of the linear portions 23, 23 extending in the radial direction is the same as the length of the linear portions 24, 24 extending in the circumferential direction. However, the lengths may be appropriately changed with considering the balance thereof so that one of the lengths of the linear portions 23, 23 and the linear portions 24, 24 becomes longer than the other of the lengths of the linear portions 23, 23 and the linear portions 24, 24.

Fifth Embodiment

Figure 10:
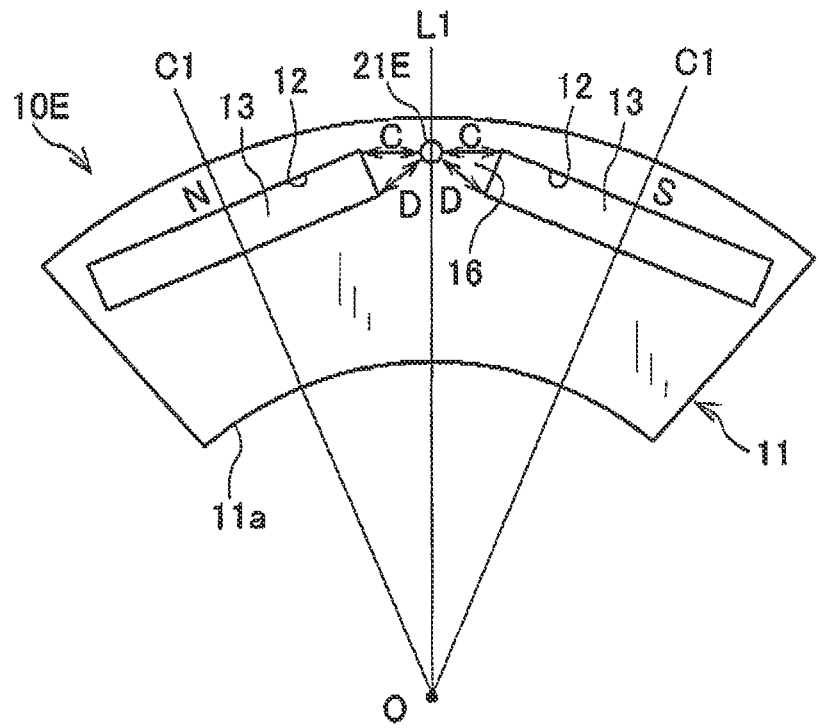
FIG. 10 is a partial plan view of a rotor, including two magnetic poles, of a rotary electric machine according to a fifth embodiment.

As shown in FIG. 10, a rotor 10E for a rotary electric machine of the fifth embodiment differs from the rotor in the first embodiment in that the number of magnetic poles is eight (N poles: 4, S poles: 4), one magnet 13 is disposed for each of the magnetic poles, and the first flux barrier 17 and the first flux barrier 18 are not provided. Hence, detailed explanations of members and configurations common to those of the first embodiment are omitted to explain different points and important points. Note that the same reference numerals as in the first embodiment denote the same parts.

The rotor core 11 of the fifth embodiment has eight magnet housing holes 12 arranged in the circumferential direction. The cross-sectional shape of the magnet housing holes 12 in the direction substantially perpendicular to the central axis O is rectangle. Long sides of the magnet housing hole 12 extend in the circumferential direction, and short sides of the housing hole 12 extend in the radial direction. One magnet 13 is buried in each of the magnet housing holes 12 to form a plurality (eight) of magnet poles whose polarities are alternately changed in the circumferential direction.

The cross-sectional shapes of the magnet housing holes 12 and the magnet 13 in the direction substantially perpendicular to the central axis O are substantially the same in size. Hence, components corresponding to the first flux barriers 17 and the second first flux barriers 18 are not provided in the rotor core 11 of the fifth embodiment, though they are provided in the rotor core 11 of the first embodiment.

The q axis core portion 16 of the rotor core 11 is provided with a crimped part 21E fixing the plurality of plates 20 laminated in the axial direction. As in the case of the crimped portion 21 of the first embodiment, the crimped part 21E of the fifth embodiment has a circular shape when viewed in the crimping direction (from the near side of FIG. 10). The crimped portion 21E is formed so that the distances between the crimped portion 21E and the short sides of the magnet housing holes 12 positioned at the q axis core portion 16 side are equal to each other. That is, as shown in FIG. 10, the crimped portion 21E is formed so that the shortest distance C between the crimped portion 21E and one end of the short side positioned at the q axis core portion 16 side is equal to the shortest distance D between the crimped portion 21E and the other end of the short side positioned at the q axis core portion 16 side (C=D). Note that, also in the case of the fifth embodiment, the center of the crimped portion 21E is positioned on the q axis center line L1.

In the rotor 10E of the fifth embodiment configured as described above, the crimped portion 21E configured in the q axis core portion 16 is formed so that the distances between the crimped portion 21E and the two magnet housing holes 12 housing the respective magnets 13, which are adjacent to each other in the circumferential direction and whose polarities are different from each other, are the same. Hence, stress concentration caused between the magnet housing holes 12 and the crimped portion 21E can be effectively decreased. Accordingly, great stress concentration can be prevented which is due to the influence of centrifugal stress and heat stress caused by the difference between coefficients of linear expansion of the rotor core 11 and the magnet 13.

In addition, the crimped portion 21E of the fifth embodiment has a circular shape when viewed in the crimping direction. According to the shape, the stress concentration is most difficult to be caused. Hence, the crimped portion 21 provides advantages similar to those of the first embodiment. For example, the stress concentration can be prevented more reliably.

Sixth Embodiment

Figure 11:
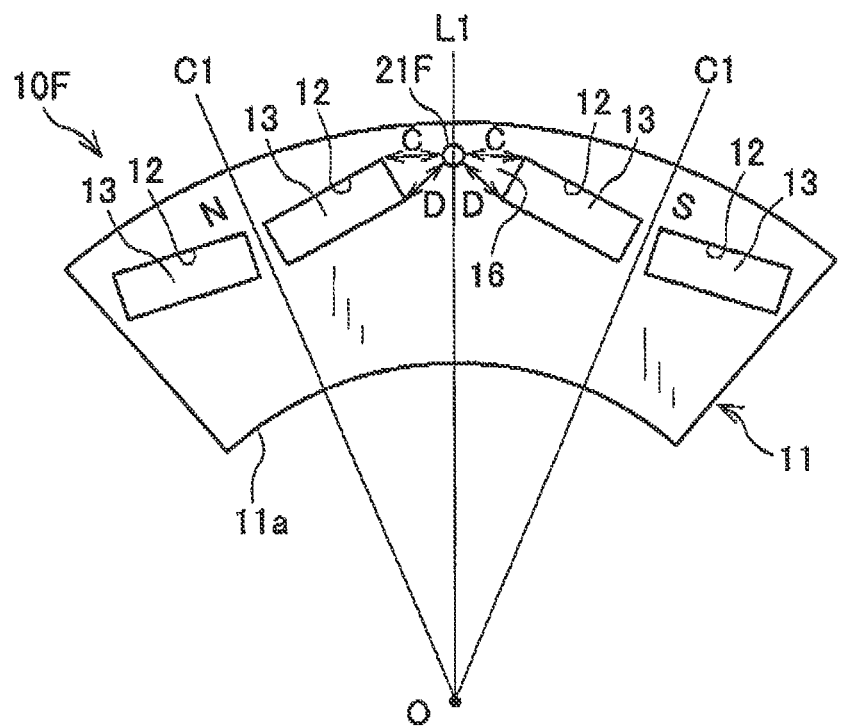
FIG. 11 is a partial plan view of a rotor, including two magnetic poles, of a rotary electric machine according to a sixth embodiment.

As shown in FIG. 11, a rotor 10F for a rotary electric machine according to the sixth embodiment differs from the rotor in the fifth embodiment in the arrangement of the magnet housing holes 12 provided in the rotor core 11 and the magnets 13 buried in the magnet housing holes 12. Hence, detailed explanations of members and configurations common to those of the fifth embodiment are omitted to explain different points and important points. Note that the same reference numerals as in the fifth embodiment denote the same parts.

The rotor core 11 of the sixth embodiment has a plurality of pairs (eight pairs) of magnet housing holes 12. The pair of magnet housing holes 12 is disposed in a V shape so that the distance therebetween increases toward the stator. The central bridge 15 having a substantially constant width is formed between the pair of magnet housing holes 12, 12 so as to extend in the radial direction. One magnetic pole is formed of a pair of magnets 13, 13 housed in the pair of magnet housing holes 12, 12 arrange in V shape. In this case, eight magnetic poles (N poles: 4, S poles: 4), whose polarities are alternately changed in the circumferential direction, are formed of eight pairs of magnets 13, 13.

The q axis core portion 16 of the rotor core 11 is provided with a crimped part 21F fixing the plurality of plates 20 laminated in the axial direction. As in the case of the crimped portion 21E of the fifth embodiment, the crimped part 21F of the sixth embodiment has a circular shape when viewed in the crimping direction (from the near side of FIG. 11). The crimped portion 21F is formed so that the distances between the crimped portion 21F and the short sides of the magnet housing holes 12 positioned at the q axis core portion 16 side are equal to each other. That is, as shown in FIG. 11, the crimped portion 21F is formed so that the shortest distance C between the crimped portion 21F and one end of the short side positioned at the q axis core portion 16 side is equal to the shortest distance D between the crimped portion 21F and the other end of the short side positioned at the q axis core portion 16 side (C=D). Note that, also in the case of the sixth embodiment, the center of the crimped portion 21F is positioned on the q axis center line L1.

The rotor 10F of the sixth embodiment configured as described above provides advantages similar to those of the rotor 10E of the fifth embodiment. For example, stress concentration caused between the crimped portion 21F and the magnet housing holes 12 can be effectively decreased.

Seventh Embodiment

Figure 12:
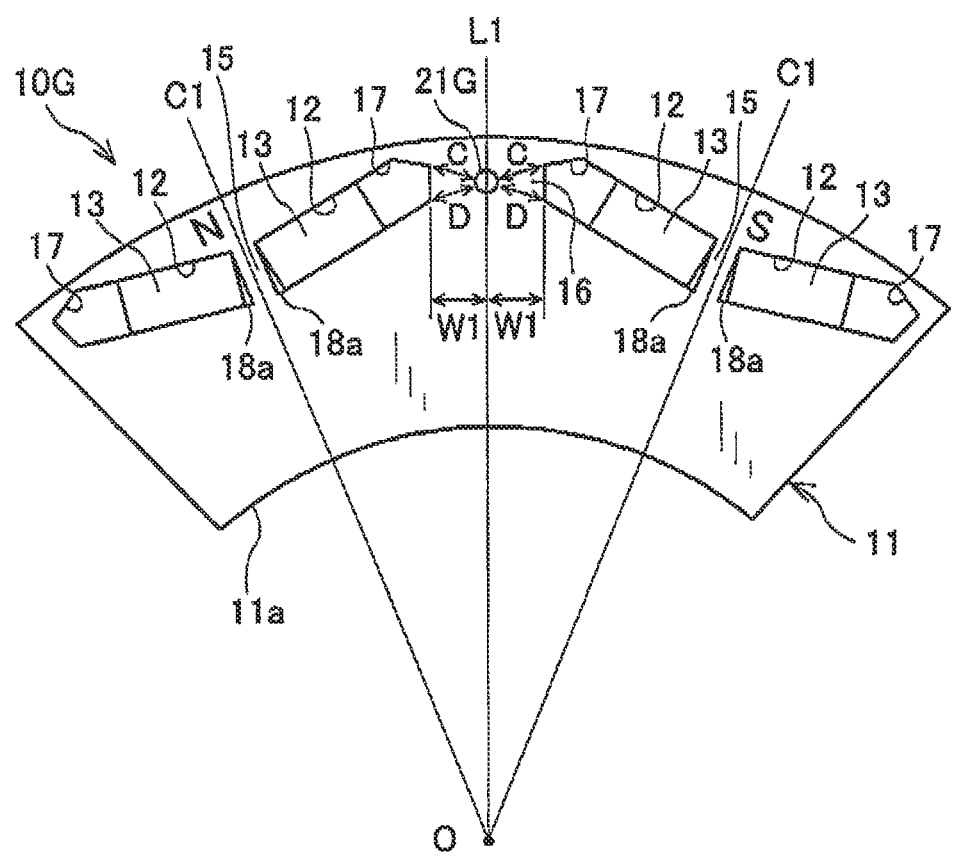
FIG. 12 is a partial plan view of a rotor, including two magnetic poles, of a rotary electric machine according to a seventh embodiment.

As shown in FIG. 12, a rotor 10G for a rotary electric machine of the seventh embodiment differs from the rotor of the sixth embodiment in the shape of the magnet housing hole 12 provided in the rotor core 11. Hence, detailed explanations of members and configurations common to those of the sixth embodiment are omitted to explain different points and important points. Note that the same reference numerals as in the sixth embodiment denote the same parts.

The rotor core 11 of the seventh embodiment has a plurality of pairs (eight pairs) of magnet housing holes 12. The pair of magnet housing holes 12 is disposed in a V shape so that the distance therebetween increases toward the stator. The central bridge 15 having a substantially constant width is formed between the pair of magnet housing holes 12 so as to extend in the radial direction. One magnetic pole is formed of a pair of magnets 13, 13 housed in the pair of magnet housing holes 12, 12 arrange in V shape. In this case, eight magnetic poles (N poles: 4, S poles: 4), whose polarities are alternately changed in the circumferential direction, are formed of eight pairs of magnets 13, 13.

In the rotor core 11 of the seventh embodiment, the first flux barrier 17, which serves as a magnetic air gap, is provided between the magnet 13 housed in the magnet housing hole 12 and the q axis core portion 16, that is, in part of the magnet housing hole 12 close to the q axis core portion 16. The outside in the circumferential direction of the first flux barrier 17 is placed so that the width in the circumferential direction is W1, which is between a q axis center line L1, which passes through the center in the circumferential direction of the q axis core portion 16 and the central axis O, and the first flux barrier 17.

A minute magnetic air gap 18a whose cross-sectional shape perpendicular to the central axis O is triangular is provided between the magnet 13 housed in the magnet housing hole 12 and the central bridge 15. The magnetic air gap 18a does not correspond to the second first flux barrier 18 of the first embodiment.

The q axis core portion 16 of the rotor core 11 is provided with a crimped part 21G fixing the plurality of plates 20 laminated in the axial direction. As in the case of the crimped portion 21E of the fifth embodiment, the crimped part 21G of the seventh embodiment has a circular shape when viewed in the crimping direction (from the near side of FIG. 12). The crimped portion 21G is formed so that the distances between the crimped portion 21G and the adjacent two first flux barriers 17 are equal to each other. That is, as shown in FIG. 12, the crimped portion 21G is formed so that the shortest distance C between the crimped portion 21G and a corner portion of the first flux barrier 17 positioned at the outer periphery side is equal to the shortest distance D between the crimped portion 21G and a corner portion of the first flux barrier 17 positioned at the inner periphery side (C=D). Note that, also in the case of the seventh embodiment, the center of the crimped portion 21G is positioned on the q axis center line L1.

The rotor 10G of the seventh embodiment configured as described above provides advantages similar to those of the rotor 10E of the fifth embodiment. For example, stress concentration caused between the crimped portion 21G and the first flux barrier 17 can be effectively decreased.

In addition, since the rotor core 11 of the seventh embodiment has the first flux barriers 17 formed between the magnets 13 housed in the magnet housing holes 12 and the q axis core portions 16, motor loss can be reduced compared with the rotor 10F of the sixth embodiment.

The first flux barriers 17 provided in the rotor core 11 of the seventh embodiment may be provided in the rotor core 11 of the fifth embodiment. Hence, the fifth embodiment can provide the advantages similar to those of the seventh embodiment.

Other Embodiments

It will be appreciated that the present invention is not limited to the configurations described above, but any and all modifications, variations or equivalents, which may occur to those who are skilled in the art, should be considered to fall within the scope of the present invention.

For example, although a rotor for a rotary electric machine according to the present invention is applied to a motor for a vehicle in the above embodiments, the rotor may be applied to a rotary electric machine which is installed in a vehicle and is used as a motor or a generator; or a rotary electric machine which can be selectively used as the motor and the generator.

Hereinafter, aspects of the above-described embodiments will be summarized.

An embodiment provides a rotor for a rotary electric machine, including: a rotor core (11) which is formed by crimping a plurality of steel plates (20) laminated in an axial direction so as to be opposed to a stator (100) in a radial direction, and has a plurality of pairs of magnet housing holes (12), each of the pairs being disposed in a V shape so that a distance between the magnet housing holes increases toward the stator; and a plurality of pairs of magnets (13) each of which is housed in the pair of the magnet housing holes to form a magnet pole. The rotor core has a crimped portion (21, 21B, 21C, 21D) which is formed in a q axis core portion (16) positioned between two of the magnet poles, which are adjacent to each other in a circumferential direction and have different polarities, a first flux barrier (17) formed between the q axis core portion and the magnet, and a pair of second flux barriers (18, 18) which enlarges from an end positioned at a center side of the magnet pole of the respective magnet housing holes, which are a pair, toward a central axis (0) of the rotor core. The crimped portion is formed so that a distance between the crimped portion and the first flux barrier is equal to a distance between the crimped portion and the second flux barrier.

According to the embodiment, the crimped portion is formed in the q axis core portion positioned between two of the magnet poles, which are adjacent to each other in the circumferential direction and have different polarities. The crimped portion is formed so that the distance between the crimped portion and the first flux barrier, which is formed between the q axis core portion and the magnet, is equal to the distance between the crimped portion and the pair of second flux barriers, which enlarge from the end positioned at a center side of the magnet pole of the respective magnet housing holes, which are a pair, toward a central axis of the rotor core. Hence, stress concentration caused between the crimped portion and both the first flux barrier and the second flux barrier can be effectively decreased. Accordingly, great stress concentration can be prevented which is due to the influence of centrifugal stress and heat stress caused by the difference between coefficients of linear expansion of the rotor core and the magnet.

Another embodiment provides a rotor for a rotary electric machine, including: a rotor core (11) which is formed by crimping a plurality of steel plates (20) laminated in an axial direction so as to be opposed to a stator (100) in a radial direction, and has a plurality of magnet housing holes (12) disposed in a circumferential direction; and a plurality of magnets (13) which are housed in the magnet housing holes to form a plurality of magnet poles, whose polarities are alternately changed in the circumferential direction. The rotor core has a crimped portion (21E, 21F, 21G) which is formed in a q axis core portion (16) positioned between two of the magnet poles, which are adjacent to each other in the circumferential direction and have different polarities. The crimped portion is formed so that distances between the crimped portion and the two of the magnet housing holes housing the respective magnets, which are adjacent to each other in the circumferential direction and have different polarities.

According to the embodiment, the crimped portion is formed in the q axis core portion positioned between two of the magnet poles, which are adjacent to each other in the circumferential direction and have different polarities. The crimped portion is formed so that distances between the crimped portion and the two of the magnet housing holes housing the respective magnets, which are adjacent to each other in the circumferential direction and have different polarities. Hence, stress concentration caused between the crimped portion and the two magnet housing holes housing respective magnets, which are adjacent to each other in the circumferential direction and whose polarities are different from each other, can be effectively decreased. Accordingly, great stress concentration can be prevented which is due to the influence of centrifugal stress and heat stress caused by the difference between coefficients of linear expansion of the rotor core and the magnet.

What is claimed is:

1. A rotor for a rotary electric machine, comprising:
   a rotor core which is formed by crimping a plurality of steel plates laminated in an axial direction so as to be opposed to a stator in a radial direction, and has a plurality of pairs of magnet housing holes, each of the pairs being disposed in a V shape so that a distance between the magnet housing holes increases toward the stator; and
   a plurality of pairs of magnets each of which is housed in the pair of the magnet housing holes to form a magnet pole, wherein
   the rotor core has a crimped portion which is formed in a q axis core portion positioned between two of the magnet poles, which are adjacent to each other in a circumferential direction and have different polarities, a first flux barrier formed between the q axis core portion and the magnet, and a pair of second flux barriers which enlarges from an end positioned at a center side of the magnet pole of the respective magnet housing holes, which are a pair, toward a central axis of the rotor core, and the crimped portion is formed so that a distance between the crimped portion and the first flux barrier is equal to a distance between the crimped portion and the second flux barrier.

2. The rotor according to claim 1, wherein the crimped portion has a circular shape when viewed in a crimping direction.

3. The rotor according to claim 1, wherein the crimped portion has a linear portion or a curve portion extending in the radial direction.

4. The rotor according to claim 1, wherein the crimped portion has a linear portion or a curve portion extending in the circumferential direction.

5. The rotor according to claim 1, wherein at least a projected outer periphery of the crimped portion comes into contact with an adjacent steel plate of the rotor core.

6. A rotor for a rotary electric machine, comprising:
a rotor core which is formed by crimping a plurality of steel plates laminated in an axial direction so as to be opposed to a stator in a radial direction, and which has a plurality of magnet housing holes disposed in a circumferential direction; and
a plurality of magnets which are housed in the magnet housing holes to form a plurality of magnet poles, whose polarities are alternately changed in the circumferential direction, wherein
the magnet housing hole has a rectangular cross-section shape in which long sides extend in the circumferential direction, and short sides extend in the radial direction,
the rotor core has a crimped portion which is formed in a q axis core portion positioned between two of the magnet poles, which are adjacent to each other in the circumferential direction and have different polarities, and
the crimped portion is formed so that a shortest distance between the crimped portion and one end of the short side positioned at a q axis core portion side of the magnet housing hole is equal to a shortest distance between the crimped portion and the other end of the short side.

7. The rotor according to claim 6, wherein
the plurality of magnet housing holes include a plurality of pairs of magnet housing holes, each of the pairs being disposed in a V shape so that a distance between the magnet housing holes increases toward the stator, and
the plurality of magnets includes a plurality of pairs of magnets, each of the pairs of magnets is housed in the pair of the magnet housing holes to form a magnet pole.

8. The rotor according to claim 6, wherein the rotor core has a flux barrier formed between the q axis core portion and the magnet housed in the magnet housing hole.

9. A rotor for a rotary electric machine, comprising:
a rotor core which is formed by crimping a plurality of steel plates laminated in an axial direction so as to be opposed to a stator in a radial direction, and has a plurality of pairs of magnet housing holes, each of the pairs being disposed in a V shape so that a distance between the magnet housing holes increases toward the stator; and
a plurality of pairs of magnets each of which is housed in the pair of the magnet housing holes to form a magnet pole, wherein
the rotor core has a crimped portion which is formed in a q axis core portion positioned between two of the magnet poles, which are adjacent to each other in a circumferential direction and have different polarities, and a flux barrier formed between the q axis core portion and the magnet, and
the crimped portion is formed so that a shortest distance between the crimped portion and a corner portion of the flux barrier positioned at an outer periphery side is equal to a shortest distance between the crimped portion and a corner portion of the flux barrier positioned at an inner periphery side.

* * * * *